United States Patent
Treillard

(10) Patent No.: US 7,162,245 B2
(45) Date of Patent: Jan. 9, 2007

(54) INTERSYSTEM CALL TRANSFER METHOD FOR USE IN CELLULAR MOBILE RADIO SYSTEMS

(75) Inventor: Pascal Treillard, Palaiseau (FR)

(73) Assignee: Alcatel, Paris (FR)

( * ) Notice: Subject to any disclaimer, the term of this patent is extended or adjusted under 35 U.S.C. 154(b) by 646 days.

(21) Appl. No.: 09/987,669

(22) Filed: Nov. 15, 2001

(65) Prior Publication Data

US 2002/0058509 A1 May 16, 2002

(30) Foreign Application Priority Data

Nov. 16, 2000 (FR) .................................. 00 14811

(51) Int. Cl.
*H04Q 7/20* (2006.01)
(52) U.S. Cl. ...................... 455/442; 455/439; 455/436; 455/561; 370/331; 370/329
(58) Field of Classification Search ................ 455/442, 455/561, 432.1, 436, 438, 439, 524, 525; 370/329, 331, 338, 400, 406, 411
See application file for complete search history.

(56) References Cited

U.S. PATENT DOCUMENTS

| | | | |
|---|---|---|---|
| 5,839,070 A | | 11/1998 | Lupien et al. |
| 5,857,153 A | * | 1/1999 | Lupien ........................ 455/436 |
| 6,131,030 A | * | 10/2000 | Schon et al. ................. 455/438 |
| 6,466,767 B1 | * | 10/2002 | Lidbrink et al. .......... 455/67.11 |
| 6,510,146 B1 | * | 1/2003 | Korpela et al. .............. 370/332 |
| 6,519,457 B1 | * | 2/2003 | Jiang et al. .................. 455/442 |
| 6,614,901 B1 | * | 9/2003 | McGrew et al. ............ 379/230 |
| 6,665,538 B1 | * | 12/2003 | Hunte ......................... 455/446 |
| 6,725,039 B1 | * | 4/2004 | Parmar et al. .............. 455/436 |
| 6,728,528 B1 | * | 4/2004 | Loke ........................... 455/318 |
| 6,765,890 B1 | * | 7/2004 | Palat et al. .................. 370/331 |

FOREIGN PATENT DOCUMENTS

| | | |
|---|---|---|
| EP | 0 898 438 A2 | 2/1999 |
| EP | 1 006 746 A2 | 6/2000 |
| WO | WO 95/08897 | 3/1995 |
| WO | WO 97/44984 | 11/1997 |

\* cited by examiner

*Primary Examiner*—Danh Cong Le
(74) *Attorney, Agent, or Firm*—Sughrue Mion, PLLC

(57) ABSTRACT

A method for intersystem transfer of calls from a first cellular mobile radio system using the macrodiversity transmission technique to a second cellular mobile radio system, the macrodiversity transmission using a radio network controller of the first system, referred to as the serving controller, and at least one other radio network controller of the first system, referred to as the drift controller, wherein adjoining cell information relating to the second system is signaled to the serving controller by at least one drift controller controlling at least one serving cell belonging to the first system and having at least one adjoining cell belonging to the second system.

27 Claims, 1 Drawing Sheet

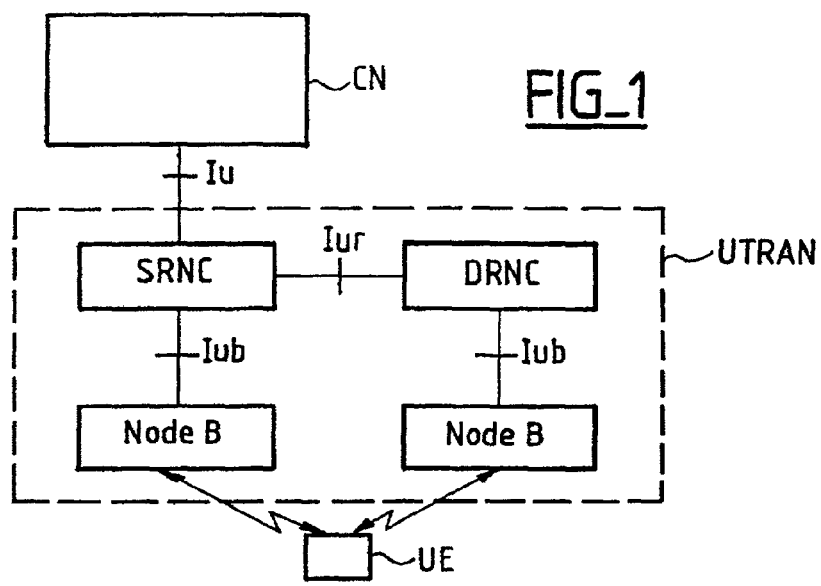
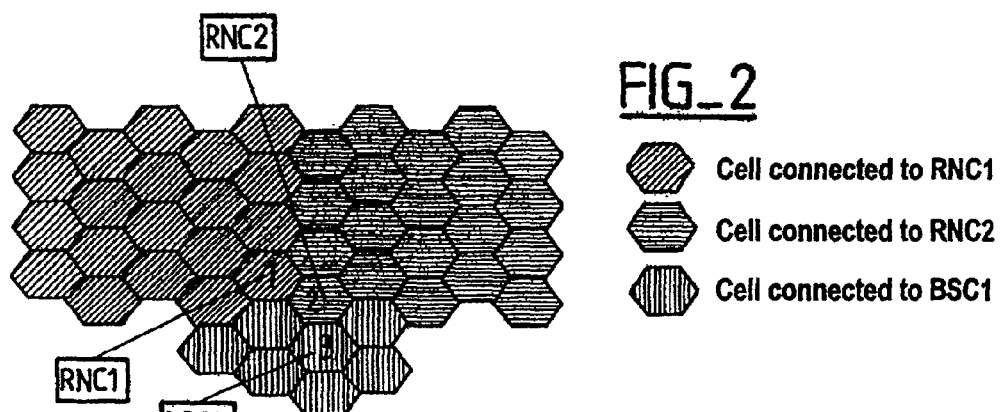
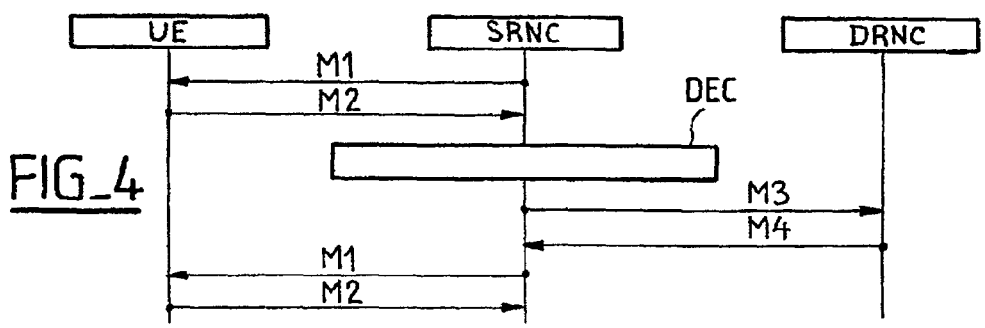

INTERSYSTEM CALL TRANSFER METHOD FOR USE IN CELLULAR MOBILE RADIO SYSTEMS

The present invention relates generally to mobile radio systems, especially code division multiple access (CDMA) systems.

BACKGROUND OF THE INVENTION

The CDMA technique is used in third generation systems in particular, such as the Universal Mobile Telecommunication System (UMTS) in particular, offering services at bit rates higher than those offered by so-called second generation systems, such as the Global System for Mobile communication (GSM) in particular.

As a general rule these systems have a cellular architecture, and intercellular transfer (handover) techniques are provided for transferring calls from cell to cell as required. Another conventional technique is the Mobile Assisted HandOver (MAHO) technique, in which a mobile station performs radio measurements on broadcast channels that are broadcast in cells adjoining its serving cell and reports the results of those radio measurements to the network, with a view to facilitating a handover decision by the network. A list of the adjoining cells on which the measurements are to be effected is generally indicated to the mobile station by the network.

Also, one technique routinely used in CDMA systems is macrodiversity transmission, whereby a mobile station is connected simultaneously to a plurality of base stations, i.e. is serviced simultaneously by a plurality of cells known as serving cells (or active cells). By using appropriate techniques for processing and combining the signals received, this improves receive performance in particular. It also minimizes the risks of call loss at the time of handovers. For this reason this technique is also known as "soft handover", as compared to the "hard handover" technique whereby a mobile station is connected at any given time to only one base station.

As general rule, and as outlined in FIG. 1, a mobile radio system includes a radio access network (called the UMTS Terrestrial Radio Network (UTRAN) in the UMTS) in turn including a set of base stations (in the UMTS a base station is referred to as a "Node B") and a set of base station controllers (referred to in the UMTS as "radio network controllers" (RNCs)). The UTRAN communicates, on the one hand, with mobile stations (a mobile station is also referred to as a "user equipment" (UE)) and, on the other hand, with a core network (CN).

In the case of macrodiversity transmission, the various "Node B" stations to which a UE is connected may or may not be controlled by the same RNC. If they are controlled by different RNC, one of those RNC, called the serving RNC (SRNC), has a control role for the call concerned, including functions of adding or removing serving cells, drawing up up-to-date lists of serving cells and adjoining cells, communicating such lists to the UE, centralized power control, etc. The "Node B" stations connected to the UE and not controlled by the SRNC communicate with the SRNC via the RNC that control them, which are referred to as drift RNC (DRNC). By way of example, FIG. 1 shows the situation of a UE connected to two "Node B" stations controlled by two different RNC, one of which has an SRNC role and the other a DRNC role.

Thus, as shown in FIG. 1, the RNC are connected:
to the "Node B" stations via an interface called the "Iub" interface,
to each other via an interface called the "Iur" interface, and
to the core network via an interface called the "Iu" interface.

In the case of macrodiversity transmission, the list of adjoining cells allows for the fact that each serving cell itself has adjoining cells. Thus to draw up the list of adjoining cells the SRNC needs to know the cells adjoining cells that it does not itself control, but which are controlled by the DRNC. The information that the SRNC needs on these adjoining cells, referred to hereinafter as "adjoining cell information", includes parameters such as: adjoining cell identification, identification of the RNC controlling it, transmit power level of the broadcast channel in that cell, etc. The identification of an adjoining cell is used to identify that cell for communication by the SRNC to the UE of the list of adjoining cells on which measurements are to be effected and then for communication of the measurement results by the UE to the SRNC. If necessary, the identification of the RNC that is controlling an adjoining cell enables the SRNC to connect that RNC, on the one hand, to set up a connection in that cell and, on the other hand, to obtain from that RNC the adjoining cells of that cell, in order to enable the process to continue. For the UMTS, for example, the adjoining cell information is specified in the document 3G TS 25.423 Version 3.3.0 Release 99, published by the 3GPP ("$3^{rd}$ Generation Partnership Project").

Two techniques can then be used. Either all the adjoining cell information necessary to respond to all possible handover schemes is provided directly in the SRNC (and therefore in each RNC, since each RNC can become the SRNC for a given connection), although this has the essential disadvantage of being relatively costly in terms of memory volume and updating adjoining cell information in the case of network configuration changes. Or the DRNCs indicate to the SRNC the adjoining cell information in respect of the adjoining cells of the serving cells that they control, when the SRNC needs it, i.e. in response to a corresponding request made by the SRNC. This avoids the previous drawbacks.

This latter technique is described, for example, in the document WO 00/11878 and is also specified, for the UMTS, in the document 3G TS 25.423 Version 3.3.0 Release 1999 already cited.

However, the above documents are limited to homogeneous systems, i.e. systems in which all the cells use the same radio access technique, here the CDMA technique. The above documents do not cover heterogeneous systems, i.e. systems in which some cells use radio access techniques other than the CDMA technique, in particular the TDMA (Time Division Multiple Access) technique used in the GSM. In other words, the above documents do not cover the case of intersystem handover, in particular from the UMTS to the GSM. For example, in the document 3G TS 25.423, only parameters characteristic of UMTS cells are included in the adjoining cell information contained in "radio link set up response", "radio link setup failure" or "radio link addition response", "radio link addition failure" signaling messages transmitted in the DRNC to SRNC direction in response to "radio link setup request" or "radio link addition request" signaling messages transmitted in the SRNC to DRNC direction.

U.S. Pat. No. 5,594,718 describes intersystem handover from a first system using the CDMA technique to a second system using a technique other than the CDMA technique. The base stations of the second system, situated at the boundary with the CDMA system, are adapted to generate a pilot signal as if they were base stations of the CDMA system. The list of adjoining base stations communicated by the CDMA system to a mobile station in this region at the boundary between the two systems then includes such base stations of the second system, and if the mobile station reports the corresponding measurement results to the network, the CDMA network recognizes that these are base stations of the second system, and if appropriate initiates a handover to the second system. A particular drawback of this kind of solution is that it necessitates adaptation of the base stations of the second system and is therefore difficult and costly.

OBJECTS AND SUMMARY OF THE INVENTION

There is therefore a need for an intersystem handover method that does not have the drawbacks or limitations mentioned previously. One object of the present invention is to satisfy that need.

Thus the present invention provides a method for intersystem transfer of calls from a first cellular mobile radio system using the macrodiversity transmission technique to a second cellular mobile radio system, said macrodiversity transmission using a radio network controller of the first system, referred to as the serving controller, and at least one other radio network controller of the first system, referred to as the drift controller, wherein adjoining cell information relating to the second system is signaled to said serving controller by at least one drift controller controlling at least one serving cell belonging to said first system and having at least one adjoining cell belonging to said second system.

The present invention also provides a mobile radio network controller for cellular mobile radio systems using the macrodiversity transmission technique, said macrodiversity transmission involving a radio network controller of the first system, referred to as the serving controller, and at least one other radio network controller of the first system, referred to as the drift controller, wherein, if said controller has a drift controller role, it includes means for signaling to a controller having a serving controller role adjoining cell information relating to at least one adjoining cell of at least one serving cell that it controls and belongs to a system different from that to which said at least one serving cell belongs.

The present invention further provides a mobile radio network controller for cellular mobile radio systems using the macrodiversity transmission technique, said macrodiversity transmission involving a radio network controller of the first system, referred to as the serving controller, and at least one other radio network controller of the first system, referred to as the drift controller, wherein, if said controller has a serving controller role, it includes means for receiving from a controller having a drift controller role, adjoining cell information relating to at least one adjoining cell of at least one serving cell controlled by said drift controller and belonging to a system different from that to which at least one serving cell belongs.

BRIEF DESCRIPTION OF THE DRAWING

Other objects and features of the present invention will become apparent on reading the following description of embodiments of the invention, which description is given with reference to the accompanying drawing, in which:

FIG. 1 outlines the general architecture of a mobile radio system, such as the UMTS in particular, FIGS. 2 and 3 illustrate by way of example the problem solved by the present invention, and FIG. 4 shows one embodiment of a method according to the invention.

MORE DETAILED DESCRIPTION

FIGS. 2 and 3 show one embodiment of a method according to the present invention.

FIG. 2 illustrates a call that either began in a UMTS cell 1 controlled by an RNC denoted RNC1 or has been transferred to the cell 1 from any other cell controlled by RNC1 in which that call began. RNC1 then has a serving RNC (SRNC) role for that call. This figure also covers any other scenario leading to the situation in which RNC1 has an SRNC role, in particular a procedure referred to as "SRNS relocation" specified for the UMTS in the document 3GPP TS 25.401 Version 3.4.0 (2000–09).

Next consider a call which is the subject of a "soft handover" to a UMTS cell 2 controlled by another RNC, denoted RNC2. Thus RNC2 has a drift RNC (DRNC) role for that call.

Next consider a call which needs to be transferred to a cell 3 adjoining the cell 2, belonging to another system, in particular the GSM, and controlled by a base station controller (BSC) of the other system.

In this case the problem that this application addresses arises, because RNC1 requires adjoining cell information relating to a cell 3 adjoining a serving cell 2 that it does not itself control (since the cell 2 is controlled by RNC2) and which belongs to another system.

FIG. 3 is intended to highlight, in the case of intersystem handover, the drawbacks of the prior art technique previously outlined, whereby all the adjoining cell information needed is previously stored in the RNC, in order to be able to respond to all possible handover schemes.

The example shown in FIG. 3 covers reconfiguring a system by adding to a system such as the UMTS a cell of another system, in particular the GSM. The GSM cell is denoted A and adjoins a UMTS cell denoted B. The cell A is controlled by a base station controller (BSC) denoted BSC1 and the cell B is controlled by an RNC denoted RNC11.

In this case, if all the adjoining cell information were stored in the RNC, it would be necessary, using information relating to the cell A, to update all the RNCs likely to have an SRNC role for a call likely to be transferred to the cell B. A relatively large number of RNCs would then have to be updated using such information, for example, as shown in FIG. 3, all the RNCs, from RNC1 to RNC11.

The present invention avoids these drawbacks in particular.

As a general rule, the method according to the invention is a method for intersystem call transfer from a first cellular mobile radio system using the macrodiversity transmission technique to a second cellular mobile radio system, said macrodiversity transmission in said first system involving a radio network controller, referred to as the serving controller, and at least one other radio network controller, referred to as the drift controller.

In accordance with the invention, adjoining cell information relating to the second system is signaled to said serving controller by at least one drift controller controlling at least one serving cell belonging to said first system and having at least one adjoining cell belonging to said second system.

FIG. 4 is intended to illustrate one embodiment of a method in accordance with the invention, more specifically in the case where said first system is the UMTS and said second system is the GSM.

The method shown in FIG. 4 includes the following steps:
- a signaling message M1 is transmitted in the SRNC to UE direction and contains in particular a list of the adjoining cells on which radio measurements are to be effected by the UE,
- in response to the message M1, the UE reports radio measurements to the SRNC in a signaling message M2,
- on the basis of the radio measurements reported in this way, and in a step denoted DEC, the SRNC decides to add a new radio link, i.e. a new serving cell for the call concerned, that new serving cell being controlled here by a different RNC, denoted DRNC,
- for setting up a new radio link via the new serving cell, a signaling message M3 is then transmitted in the SRNC to DRNC direction,
- in response to the message M3, a message M4 is transmitted in the DRNC to SRNC direction, the message M4 containing information relating to adjoining cells, the adjoining cells here including GSM cells if said new serving cell has at least one adjoining GSM cell, and
- after reception by the SRNC of the message M4, the SRNC transmits to the UE a new signaling message M1 containing an updated list of adjoining cells, the updated list here including GSM cells, if the adjoining cell information contained in the message M4 transmitted previously by the DRNC to the SRNC includes such cells.

In the application example considered here:
- the signaling message M1 is the "DCCH measurement control" message defined in the document 3G TS 25.331 published by the 3GPP ("3$^{rd}$ Generation Partnership Project"),
- the signaling message M2 is the message "DCCH measurement report" defined in the same document 3G TS 25.331,
- the signaling message M3 can, as appropriate, be either of the "radio link setup request" and "radio link addition request" messages defined in the document 3G TS 25.423 previously cited, and
- the signaling message M4 can, as appropriate, be one of the messages "radio link setup response", "radio link addition response", "radio link setup failure" and "radio link addition failure" defined by the same document 3G TS 25.423.

In the application example considered here, the adjoining cell information includes in particular, as parameters relating to GSM cells, information such as, for example:
- a CGI (Cell Global Identification or Cell Global Identity) as defined in GSM recommendation 03.03 in particular,
- a BSIC (Base Station Identity Code) as defined in GSM recommendation 03.03 in particular, and
- a BCCH ARFCN (Broadcast Control Channel Absolute Radio Frequency Channel Number) as defined in GSM recommendation 05.05 in particular.

In this example the pair (BCCH ARFCN, BSIC) could be called the radio identification of a GSM cell and the parameter CGI could be called its network identification. The former is used by the mobile station to find the cells on which it must perform measurements and the latter is supplied by the RNC to its MSC (Mobile Switching Center, part of the FIG. 1 core network (CN)) for it to find the BSC that is controlling it. In other words, to obtain the adjoining cell information relating to a GSM cell it is sufficient to give the identification of that cell, and it is not necessary also to give the identification of the BSC that is controlling it.

The present invention also provides, in addition to a method of the above kind, a mobile radio network controller, in particular an RNC for a network such as the UMTS.

In accordance with the invention, that controller essentially includes, if it has a drift controller role, means for signaling to a controller having a serving controller role information relating to at least one adjoining cell of at least one serving cell that it controls and belongs to a system different from that to which said at least one serving cell belongs.

According to the invention, that controller essentially includes, if it has a serving controller role, means for receiving from a controller having a drift controller role information relating to at least one adjoining cell of at least one serving cell controlled by said drift controller and belonging to a system different from that to which said at least one serving cell belongs.

The particular implementation of such means presenting no particular difficulty to the person skilled in the art, such means do not need to be described here in more detail than by reference to their function, as previously.

The invention claimed is:

1. A method for intersystem transfer of calls from a first cellular mobile radio system using the macrodiversity transmission technique to a second cellular mobile radio system, said first cellular mobile radio system comprising a radio network controller operating as a serving controller and at least one radio network controller operating as a drift controller, said drift controller controlling at least one serving cell, said at least one serving cell belonging to the first system and having at least an adjacent cell belonging to the second system, said method comprising a step of said drift controller sending to said serving controller information relating to said at least one cell of the second system.

2. The method according to claim 1, wherein said first system is a Universal Mobile Telecommunication System (UMTS) system, and said information relating to said at least one cell of the second system is signaled in a message of the "Radio Link Setup Response" type.

3. The method according to claim 1, wherein said first system is a Universal Mobile Telecommunication System (UMTS) system, and said information relating to said at least one cell of the second system is signaled in a message of the "Radio Link Addition Response" type.

4. The method according to claim 1, wherein said first system is a Universal Mobile Telecommunication System (UMTS) system, and said information relating to said at least one cell of the second system is signaled in a message of the "Radio Link Setup Failure" type.

5. The method according to claim 1, wherein said first system is a Universal Mobile Telecommunication System (UMTS) system, and said information relating to said at least one cell of the second system is signaled in a message of the "Radio Link Addition Failure" type.

6. The method according to claim 1, wherein said second system is a Global System for Mobile Communication (GSM) system, and said information relating to said at least one cell of the second system includes Cell Global Identity (CGI) information.

7. The method according to claim 1, wherein said second system is a Global System for Mobile Communication (GSM) system, and said information relating to said at least one cell of the second system includes Base Station Identity Code (BSIC) information.

8. The method according to claim 1, wherein said second system is a Global System for Mobile Communication (GSM) system, and said information relating to said at least one cell of the second system includes Broadcast Control Channel Absolute Radio Frequency Channel Number (BCCH ARFCN) information.

9. The method according to claim 1, wherein said first system is a Universal Mobile Telecommunication System (UMTS) system, and said second system is a Global System for Mobile Communication (GSM) system.

10. A mobile radio network controller for intersystem transfer of calls from a first cellular mobile radio system using the macrodiversity transmission technique to a second cellular mobile radio system, said first cellular mobile radio system comprising a radio network controller operating as a serving controller and at least one radio network controller operating as a drift controller, said drift controller controlling at least one serving cell, said at least one serving cell belonging to the first system and having at least an adjacent cell belonging to the second system, said controller including means for sending to said serving controller information relating to said at least one cell of the second system.

11. The mobile radio network controller according to claim 10, wherein said first system is a Universal Mobile Telecommunication System (UMTS) system, and said information relating to said at least one cell of the second system is signaled in a message of the "Radio Link Setup Response" type.

12. The mobile radio network controller according to claim 10, wherein said first system is a Universal Mobile Telecommunication System (UMTS) system, and said information relating to said at least one cell of the second system is signaled in a message of the "Radio Link Addition Response" type.

13. The mobile radio network controller according to claim 10, wherein said first system is a Universal Mobile Telecommunication System (UMTS) system, and said information relating to the second system is signaled in a message of the "Radio Link Setup Failure" type.

14. The mobile radio network controller according to 10, wherein said first system is a Universal Mobile Telecommunication System (UMTS) system, and said information relating to the second system is signaled in a message of the "Radio Link Addition Failure" type.

15. The mobile radio network controller according to claim 10, wherein said second system is a Global System for Mobile Communication (GSM) system, and said information relating to said at least one cell of the second system includes Cell Global Identity (CGI) information.

16. The mobile radio network controller according to claim 10, wherein said second system is a Global System for Mobile Communication (GSM) system, and said information relating to said at least one cell of the second system includes Base Station Identity Code (BSIC) information.

17. The mobile radio network controller according to claim 10, wherein said second system is a Global System for Mobile Communication (GSM) system, and said adjoining cell information relating to said at least one cell of the second system includes Broadcast Control Channel Absolute Radio Frequency Channel Number (BCCH ARFCN) information.

18. The mobile radio network controller according to claim 10, wherein said first system is a Universal Mobile Telecommunication System (UMTS) system, and said second system is a Global System for Mobile Communication (GSM) system.

19. A mobile radio network controller for intersystem transfer of calls from a first cellular mobile radio system using the macrodiversity transmission technique to a second cellular mobile radio system, said first cellular mobile radio system comprising said mobile radio network controller operating as a serving controller and at least one other radio network controller operating as a drift controller, said drift controller controlling at least one serving cell, said at least one serving cell belonging to the first system and having at least an adjacent cell belonging to the second system, wherein said mobile radio network controller is said serving controller and includes means for receiving from said drift controller information relating to said at least one cell of the second system.

20. The mobile radio network controller according to claim 19, wherein said first system is a Universal Mobile Telecommunication System (UMTS) system, and said information relating to said at least one cell of the second system is signaled in a message of the "Radio Link Setup Response" type.

21. The mobile radio network controller according to claim 19, wherein said first system is a Universal Mobile Telecommunication System (UMTS) system, and said information relating to said at least one cell of the second system is signaled in a message of the "Radio Link Addition Response" type.

22. The mobile radio network controller according to claim 19, wherein said first system is a Universal Mobile Telecommunication System (UMTS) system, and said information relating to said at least one cell of the second system is signaled in a message of the "Radio Link Setup Failure" type.

23. The mobile radio network controller according to claim 15, wherein said first system is a Universal Mobile Telecommunication System (UMTS) system, and said information relating to said at least one cell of the second system is signaled in a message of the "Radio Link Addition Failure" type.

24. The mobile radio network controller according to claim 15, wherein said second system is a Global System for Mobile Communication (GSM) system, and said adjoining cell information relating to the second system includes Cell Global Identity (CGI) information.

25. The mobile radio network controller according to claim 19, wherein said second system is a Global System for Mobile Communication (GSM) system, and said information relating to said at least one cell of the second system includes Base Station Identity Code (BSIC) information.

26. The mobile radio network controller according to claim 19, wherein said second system is a Global System for Mobile Communication (GSM) system, and said information relating to said at least one cell of the second system includes Broadcast Control Channel Absolute Radio Frequency Channel Number (BCCH ARFCN) information.

27. The mobile radio network controller according to claim 19, wherein said first system is a Universal Mobile Telecommunication System (UMTS) system, and said second system is a Global System for Mobile Communication (GSM) system.

* * * * *